United States Patent
Arjakine et al.

(10) Patent No.: US 9,035,213 B2
(45) Date of Patent: May 19, 2015

(54) METHOD FOR WELDING WORKPIECES MADE OF HIGHLY HEAT-RESISTANT SUPERALLOYS, INCLUDING A PARTICULAR MASS FEED RATE OF THE WELDING FILLER MATERIAL

(75) Inventors: Nikolai Arjakine, Berlin (DE); Georg Bostanjoglo, Berlin (DE); Bernd Burbaum, Falkensee (DE); Andres Gasser, Aachen (DE); Torsten Jambor, Köln (DE); Stefanie Linnenbrink, Kreuzau (DE); Torsten Melzer-Jokisch, Neuenhagen bei Berlin (DE); Selim Mokadem, Nürnberg (DE); Michael Ott, Mülheim an der Ruhr (DE); Norbert Pirch, Aachen (DE); Rolf Wilkenhöner, Kleinmachnow (DE)

(73) Assignees: SIEMENS AKTIENGESELLSCHAFT, München (DE); FRAUNHOFER GESELLSCHAFT ZUR FÖRDERUNG DER ANGEWANDTEN FORSCHUNG E. V., München (DE)

( * ) Notice: Subject to any disclaimer, the term of this patent is extended or adjusted under 35 U.S.C. 154(b) by 243 days.

(21) Appl. No.: 13/509,002
(22) PCT Filed: Nov. 10, 2010
(86) PCT No.: PCT/EP2010/067188
§ 371 (c)(1), (2), (4) Date: Jul. 11, 2012
(87) PCT Pub. No.: WO2011/058045
PCT Pub. Date: May 19, 2011

(65) Prior Publication Data
US 2012/0267347 A1  Oct. 25, 2012

(30) Foreign Application Priority Data
Nov. 13, 2009 (EP) .................................. 09014234

(51) Int. Cl.
B23K 26/34 (2014.01)
B05B 7/22 (2006.01)
(Continued)

(52) U.S. Cl.
CPC ................. *B05B 7/228* (2013.01); *B23K 26/34* (2013.01); *B23K 26/32* (2013.01);
(Continued)

(58) Field of Classification Search
CPC ............... B23K 26/00; B23K 26/0006; B23K 26/0012; B23K 26/0015; B23K 26/32–26/322; B23K 26/34–26/345
USPC ........... 219/121.63, 121.64, 121.85; 148/516, 148/521, 525
See application file for complete search history.

(56) References Cited

U.S. PATENT DOCUMENTS 3,156,968 A * 11/1964 White, Jr. ........................ 492/53
4,804,815 A * 2/1989 Everett ..................... 219/121.66
(Continued)

FOREIGN PATENT DOCUMENTS

CA 2414019 6/2003
EP 0486489 B1 11/1994
(Continued)

OTHER PUBLICATIONS

Communication From European Patent Office, May 12, 2010, pp. 1-6.

Primary Examiner — Samuel M Heinrich

(57) ABSTRACT

A welding method for welding workpieces made of highly heat-resistant superalloys is provided. The method includes generating a heat input zone on the workpiece surface by means of a heat source, feeding welding filler material into the heat input zone by means of a feeding device, and generating a relative motion between the heat source and the feeding device on one hand and the workpiece surface on the other hand by means of a conveying device. Furthermore, according to the welding method, the mass feed rate is ≤350 mg/min.

19 Claims, 6 Drawing Sheets

(51) Int. Cl.
  *B23K 26/32* (2014.01)
  *B23P 6/00* (2006.01)
  *B23K 35/00* (2006.01)
  *B23K 35/02* (2006.01)
  *C21D 9/50* (2006.01)

(52) U.S. Cl.
  CPC .......... *B23K 2201/001* (2013.01); *B23P 6/007* (2013.01); *F05B 2230/232* (2013.01); *F05B 2230/30* (2013.01); *F05B 2230/80* (2013.01); *B23K 26/3206* (2013.01); *B23K 26/3213* (2013.01); *B23K 26/345* (2013.01); *B23K 35/007* (2013.01); *B23K 35/0244* (2013.01); *C21D 9/50* (2013.01)

(56) References Cited

U.S. PATENT DOCUMENTS

| | | | |
|---|---|---|---|
| 5,154,885 A | 10/1992 | Czech et al. | |
| 5,160,822 A | 11/1992 | Aleshin | |
| 5,208,431 A | 5/1993 | Kaga | |
| 5,319,179 A | 6/1994 | Birner | |
| 5,395,584 A * | 3/1995 | Berger et al. | 420/443 |
| 5,401,307 A | 3/1995 | Czech et al. | |
| 5,453,329 A | 9/1995 | Blankshain | |
| 5,993,980 A | 11/1999 | Schmitz et al. | |
| 6,054,672 A | 4/2000 | Foster | |
| 6,120,624 A | 9/2000 | Corrigan | |
| 6,231,692 B1 | 5/2001 | Vogt et al. | |
| 6,610,419 B1 | 8/2003 | Stamm | |
| 6,676,892 B2 * | 1/2004 | Das et al. | 419/7 |
| 6,994,920 B2 * | 2/2006 | Trewiler | 428/670 |
| 7,005,015 B2 | 2/2006 | Burgel et al. | |
| 2002/0148817 A1 | 10/2002 | Tewari | |
| 2003/0010809 A1 * | 1/2003 | Lewandowski et al. | 228/122.1 |
| 2004/0011439 A1 | 1/2004 | Corrigan et al. | |
| 2004/0191064 A1 | 9/2004 | Guo | |
| 2005/0067466 A1 * | 3/2005 | Boegli et al. | 228/119 |
| 2005/0133527 A1 | 6/2005 | Dullea | |
| 2011/0052386 A1 * | 3/2011 | Schoonover et al. | 415/208.1 |

FOREIGN PATENT DOCUMENTS

| | | |
|---|---|---|
| EP | 0412397 B1 | 3/1998 |
| EP | 0786017 B1 | 3/1999 |
| EP | 1319729 A1 | 6/2003 |
| EP | 1204776 B1 | 6/2004 |
| EP | 1306454 B1 | 10/2004 |
| RU | 2284251 C2 | 9/2006 |
| WO | WO 9967435 A1 | 12/1999 |
| WO | WO 0044949 A1 | 8/2000 |

* cited by examiner

METHOD FOR WELDING WORKPIECES MADE OF HIGHLY HEAT-RESISTANT SUPERALLOYS, INCLUDING A PARTICULAR MASS FEED RATE OF THE WELDING FILLER MATERIAL

CROSS REFERENCE TO RELATED APPLICATIONS

This application is the US National Stage of International Application No. PCT/EP2010/067188, filed Nov. 10, 2010 and claims the benefit thereof. The International Application claims the benefits of European Patent Office application No. 09014234.0 EP filed Nov. 13, 2009. All of the applications are incorporated by reference herein in their entirety.

FIELD OF INVENTION

The present invention relates to a method for welding workpieces, in particular gas turbine workpieces, for example gas turbine blades.

BACKGROUND OF INVENTION

Moving blades of gas turbines are exposed to high temperatures and strong mechanical loads during operation. Nickel-based superalloys, which can be strengthened by precipitation of a γ' phase, are therefore used with preference for such components. Nevertheless, cracks may occur over time in the moving blades and spread further as time progresses. Such cracks may be caused for instance by extreme mechanical loading during the operation of a gas turbine, but they may also already occur during the production process. Since the production of turbine blades and other workpieces of such superalloys is complex and cost-intensive, there are efforts to produce as little scrap as possible in production and to ensure a long service life of the products produced.

Gas turbine blades that are in operation are routinely serviced and exchanged where necessary, if satisfactory functioning can no longer be ensured with certainty because of operationally related loading. To make it possible for exchanged turbine blades to be used further, wherever possible they are refurbished. They can then be used once again in a gas turbine. Such refurbishment may, for example, involve the necessity for build-up welding in damaged regions, in order to restore the original wall thickness.

Turbine blades which have already developed cracks during the production process may, for example, be made fit for use by build-up welding, so that scrap can be avoided in production.

However, at present, it is only with difficulty that the γ'-strengthened nickel-based superalloys can be welded with welding fillers of the same type by means of conventional welding methods. The reason for this is that micro-segregations, that is to say microscopic separations, of the molten material, must be avoided. Moreover, the welding process itself can lead to the generation of cracks in the welded region during subsequent heat treatments. These are caused by residual welding stresses due to plastic deformations during the heat input when welding.

In order to circumvent the difficult weldability of the γ'-hardened nickel-based superalloys, welding is often performed with ductile welding fillers, for instance with nickel-based alloys without γ' hardening. One such typical nickel-based alloy without γ' hardening is, for example, IN 625. The ductility of the filler that is not γ' hardened allows the reduction of welding stresses due to plastic deformations during the first heat treatment after welding. However, the unhardened alloys have lower high-temperature resistance (both low tensile strength and low creep strength) in comparison with γ'-hardened nickel-based superalloys. Therefore, welding methods without ductile fillers are used with preference. These methods may be divided into two classes, methods in which overaging of the base material takes place to increase the ductility by means of coarsening of the γ' phase and methods in which the welding process is carried out with a preheated substrate. Carrying out the welding process on a preheated substrate avoids the residual welding stresses by means of recovery during the welding process.

A welding process with prior overaging is described, for example, in U.S. Pat. No. 6,120,624, a welding process carried out on a preheated workpiece is described, for example, in U.S. Pat. No. 5,319,179.

However, the two mentioned welding methods without ductile welding fillers likewise have disadvantages. For example, in the case of overaging carried out before the welding process, a corresponding heat treatment of the γ'-hardenable nickel-based superalloys is carried out before the welding, in order to bring about the overaging of the γ' phase. The ductility of the base material is thereby increased significantly. This increase in the ductility makes it possible to weld the material at room temperature. Moreover, it can be cold-straightened. Furthermore, such a heat treatment makes it possible for nickel-based superalloys such as, for example, Rene 41 or Haynes 282 to be used as a welding filler. Although these form γ' phases in the microstructure, they do so only with a significantly smaller proportion of the volume than the typical γ'-containing nickel-based superalloys that are used nowadays for gas turbine hot-gas components, such as gas turbine blades (for example IN 738 LC, IN 939, Rene 80, IN 6203 DS, PWA 1483 SX, Alloy 247, etc.). Therefore, even when overaging is performed before the welding process, no full structural weldings take place.

If a preheating of the turbine blade is performed, the temperature difference and the resultant stress gradient between the weld point and the rest of the turbine blade is reduced, whereby the formation of welding cracks in components of nickel-based superalloys can be avoided. Such methods in which preheating of the turbine blade to temperatures between 900° C. and 1000° C. is performed by means of induction coils must, however, be carried out under shielding gas, which makes the welding process complicated and expensive. Moreover, as a result of lack of accessibility to the workpiece located in a shielding gas enclosure, this method cannot be carried out on all regions of the workpiece.

There is therefore a need for an alternative welding method for build-up welding that is suitable in particular for γ'-hardened nickel-based superalloys and does not have the aforementioned disadvantages, or only to a reduced extent.

SUMMARY OF INVENTION

The object is achieved by a method for build-up welding as claimed in the claims.

The dependent claims contain advantageous refinements of the invention and can be advantageously combined with one another as desired.

In the method according to the invention for welding workpieces of high-temperature superalloys, welding filler is applied to the workpiece surface by means of a heat input zone and a supply zone for supplying the welding filler into the heat input zone. The heat input zone and the supply zone are moved over the workpiece surface during the welding.

The movement may take place along a welding direction, for example on a linear path or on a path oscillating around the welding direction.

The mass feed rate according to the invention is ≤350 mg/min. In a development of the method, the welding parameters are chosen such that the cooling rate during the solidifying of the material is at least 8000 K/s.

The main parameters available for setting the cooling rate of at least 8000 K/s during the solidifying of the material are the method parameters with respect to the welding power and the diameter of the heat input zone, for example in the form of a laser power and a diameter of the laser beam, the feed (the speed of the process) and possibly the stream of welding filler supplied. Depending on the type of laser source used, the required cooling rate for the material to be welded can be set by suitable adaptation of these parameters. The speed of the process here may be at least 250 mm/min, particularly more than 500 mm/min. For example, with a speed of the process of more than 500 mm/min, the method parameters with respect to the welding power and the diameter of the heat input zone can be set such that the cooling rate during the solidifying of the material is at least 8000 K/s.

The high cooling rate and high solidifying rate have the effect of increasing the distribution coefficient to such an extent that micro segregations, i.e. microscopic separations, of the molten material are largely avoided. The molten material in the weld metal solidifies dendritically, that is to say in a tree-like structure, the directions of growth of the dendrites varying along the welding trace, since the orientation of the possible directions of growth of the dendrites in relation to the temperature gradient on the solidification front varies. That direction of growth with the smallest inclination in relation to the temperature gradient or with the smallest rate of growth prevails. In addition, seeds form ahead of the solidification front, which catches up with them during the solidification. These seeds initiate directions of dendrite growth that are randomly distributed.

The method according to the invention is suitable, for example, for welding workpieces of a γ'-containing nickel-based superalloy by means of a welding filler which is a γ'-forming nickel-based superalloy material. A high strength can be achieved in the weld metal as a result of the use of filler of the same type and acceptable welding quality can be achieved, i.e. a very small number of cracks and a very low average crack length. As a result of the possibility of carrying out the welding process at room temperature with a shielding gas atmosphere locally around the melting bath, the welding method according to the invention becomes highly cost-effective.

The method may be designed in particular as a build-up welding method, in which the welding filler is applied layer by layer. As this happens, the welding directions of successive layers may be turned with respect to one another, particularly by 90°. Turning the welding direction of different layers allows attachment defects between the layers to be avoided, in particular whenever the heat input zone and the supply zone are also moved over the workpiece surface along the welding direction on a path that oscillates around the welding direction.

The irregularly distributed dendrite orientation is mainly in the upper half of the welding trace. Therefore, in the method according to the invention, a previously applied layer is remelted in less than half its layer thickness. In this case, the crystal structure of the remelted regions is taken over during solidification. The small remelting depth ensures that the solidification front comes down on a region with irregularly distributed dendrite orientations. In the case of multi-layer welding, this has the result that a polycrystal with grains of a very small average diameter is generated. Grain boundaries generally represent a weakness with respect to crack formation under transient stresses during the welding process or subsequent heat treatment. The low expansion of a grain boundary in the plane and its irregular orientation in the weld metal welded by the method according to the invention have the effect that the weld metal is less sensitive to crack formation, so that the welding process can be carried out at room temperature.

The method according to the invention can be used both in the case of polycrystalline substrates and in the case of directionally solidified or monocrystalline substrates. In all the cases mentioned, a γ'-containing nickel-based superalloy may be used as the welding filler.

In the course of the welding method according to the invention, the application of the welding filler may be followed by a heat treatment. With a heat treatment adapted to the weld metal, the desired γ' morphology can be set. This serves for further improving the strength of the weld metal.

A welding apparatus according to the invention for welding high-temperature superalloys that is suitable for carrying out the method according to the invention comprises a heat source for producing a heat input zone on the workpiece surface, a supplying device for supplying welding fillers into the heat input zone and a transporting device for producing a relative movement between the heat source and the supplying device on the one hand and the workpiece surface on the other hand. The transporting device is advantageously connected to the heat source and the supplying device for the welding filler, in order to move the heat source and the supplying device to bring about the relative movement. This is generally less problematic than moving the workpiece. In the welding apparatus according to the invention, a laser may be used in particular as the heat source. The welding apparatus according to the invention also comprises a control unit with a control program, which sets the welding parameters such that the cooling rate during the solidifying of the material is at least 8000 Kelvins per second. In particular, the control unit can set the welding parameters with respect to the welding power and the diameter of the heat input zone such that the cooling rate during the solidifying of the material is at least 8000 Kelvins per second. The welding can be carried out here with a speed of the process of at least 250 mm per minute, particularly with a speed of the process of more than 500 mm per minute.

The relative movement may be controlled in particular in such a way that the heat input zone and the supply zone are moved over the workpiece surface along a welding direction on a path oscillating around the welding direction.

Furthermore, the control unit may carry out the relative movement with or without oscillation in such a way that the welding directions for successive layers are turned with respect to one another, for example by 90°.

BRIEF DESCRIPTION OF THE DRAWINGS

Further features, properties and advantages of the present invention emerge from the following description of exemplary embodiments with reference to the accompanying figures.

DETAILED DESCRIPTION OF INVENTION

Figure 1:
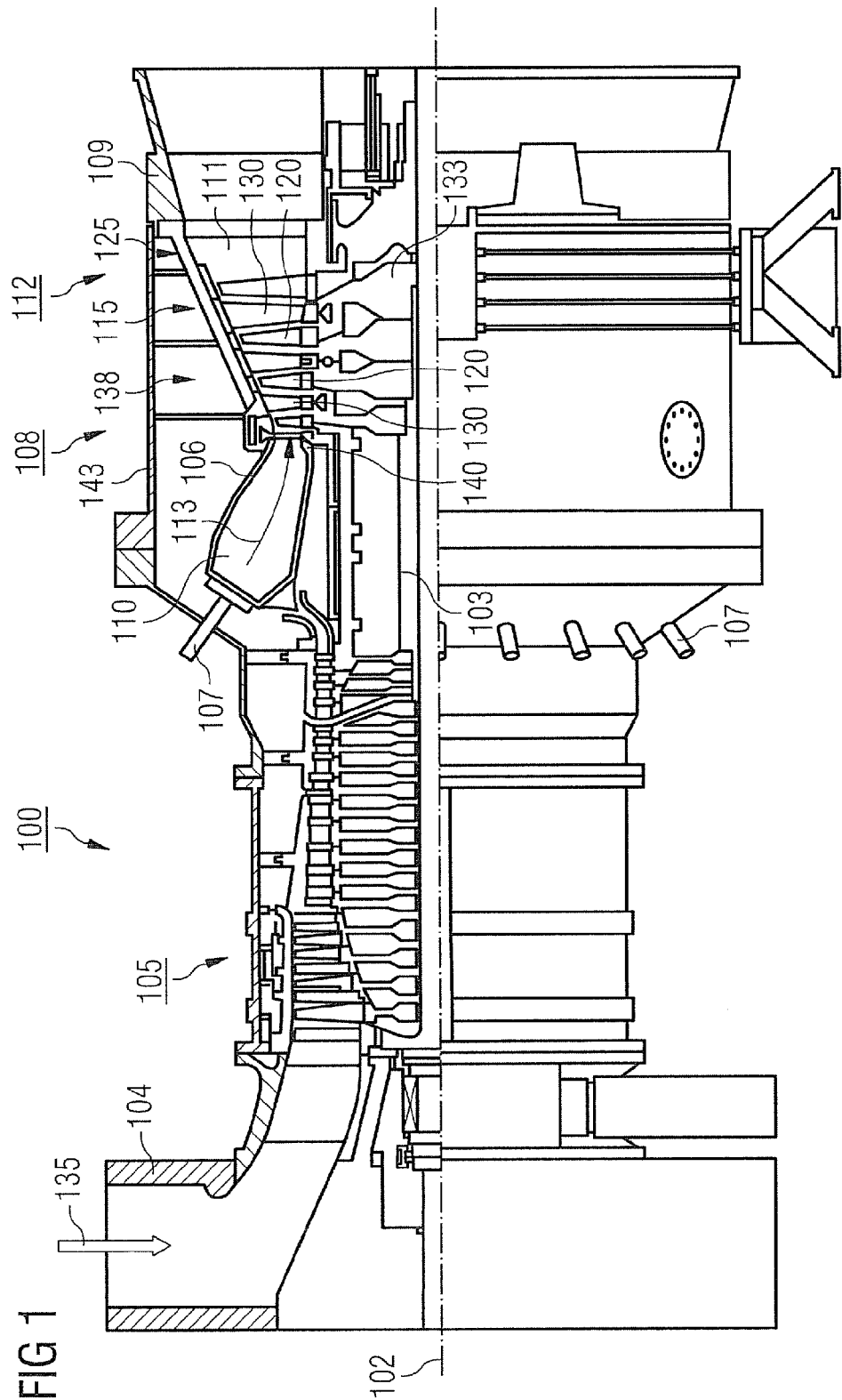
FIG. 1 shows by way of example a gas turbine in a longitudinal partial section.

FIG. 1 shows by way of example a gas turbine 100 in a longitudinal partial section.

The gas turbine 100 has in the interior a rotor 103 with a shaft 101, which is rotatably mounted about an axis of rotation 102 and is also referred to as a turbine runner.

Following one another along the rotor 103 are an intake housing 104, a compressor 105, a combustion chamber 110, for example of a toroidal form, in particular an annular combustion chamber with a number of coaxially arranged burners 107, a turbine 108 and the exhaust housing 109.

The annular combustion chamber 110 communicates with a hot gas duct 111, for example of an annular form. There, the turbine 108 is formed for example by four successive turbine stages 112.

Each turbine stage 112 is formed for example by two blade rings. As seen in the direction of flow of a working medium 113, a row of stationary blades 115 is followed in the hot gas duct 111 by a row 125 formed by moving blades 120.

The stationary blades 130 are in this case fastened to an inner housing 138 of a stator 143, whereas the moving blades 120 of a row 125 are attached to the rotor 103, for example by means of a turbine disk 133.

Coupled to the rotor 103 is a generator or a machine (not represented).

During the operation of the gas turbine 100, air 135 is sucked in by the compressor 105 through the intake housing 104 and compressed. The compressed air provided at the end of the compressor 105 on the turbine side is passed to the burners 107 and mixed there with a fuel. The mixture is then burned in the combustion chamber 110 to form the working medium 113. From there, the working medium 113 flows along the hot gas duct 111 past the stationary blades 130 and the moving blades 120. At the moving blades 120, the working medium 113 expands, transferring momentum, so that the moving blades 120 drive the rotor 103 and the latter drives the machine coupled to it.

The components that are exposed to the hot working medium 113 are subjected to thermal loads during the operation of the gas turbine 100. The stationary blades 130 and moving blades 120 of the first turbine stage 112, as seen in the direction of flow of the working medium 113, are thermally loaded the most, along with the heat shielding elements lining the annular combustion chamber 110.

In order to withstand the temperatures prevailing there, these may be cooled by means of a coolant.

Similarly, substrates of the components may have a directional structure, i.e. they are monocrystalline (SX structure) or only have longitudinally directed grains (DS structure).

Iron-, nickel- or cobalt-based superalloys are used for example as the material for the components, in particular for the turbine blade 120, 130 and components of the combustion chamber 110.

Such superalloys are known, for example, from EP 1 204 776 B1, EP 1 306 454, EP 1 319 729 A1, WO 99/67435 or WO 00/44949.

Similarly, the blades 120, 130 may have coatings against corrosion (MCrAlX; M is at least one element of the group comprising iron (Fe), cobalt (Co) and nickel (Ni), X is an active element and represents yttrium (Y) and/or silicon, scandium (Sc) and/or at least one element of the rare earths, or hafnium). Such alloys are known from EP 0 486 489 B1, EP 0 786017 B1, EP 0 412 397 B1 or EP 1 306 454 A1.

A thermal barrier coating, which consists for example of $ZrO_2$, $Y_2O_3$—$ZrO_2$, i.e. is unstabilized, partially stabilized or completely stabilized by yttrium oxide and/or calcium oxide and/or magnesium oxide, may also be present on the MCrAlX.

Columnar grains are produced in the thermal barrier coating by suitable coating methods, such as for example electron-beam physical vapor deposition (EB-PVD).

The stationary blade 130 has a stationary blade root (not represented here), facing the inner housing 138 of the turbine 108, and a stationary blade head, at the opposite end from the stationary blade root. The stationary blade head faces the rotor 103 and is fixed to a fastening ring 140 of the stator 143.

Figure 2:
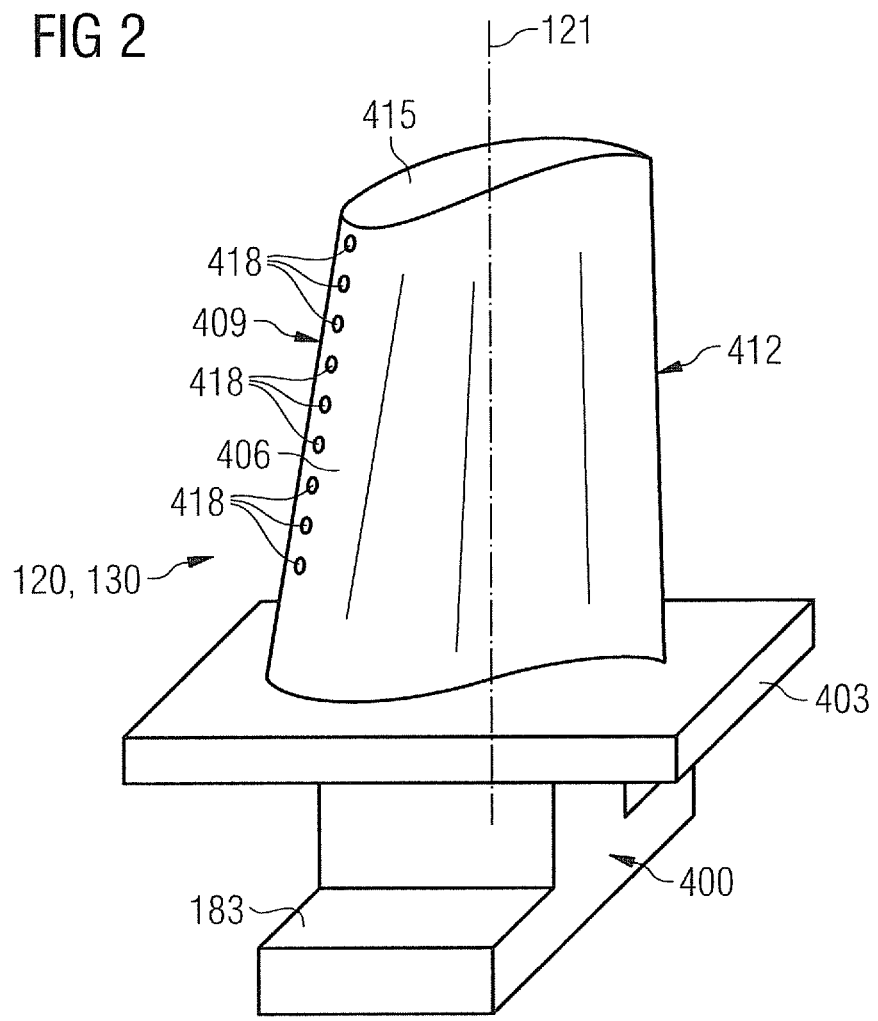
FIG. 2 shows a turbine blade in a perspective view.

FIG. 2 shows in a perspective view a moving blade 120 or stationary blade 130 of a turbomachine, which extends along a longitudinal axis 121.

The turbomachine may be a gas turbine of an aircraft or of a power plant for generating electricity, a steam turbine or a compressor.

The blade 120, 130 has, following one after the other along the longitudinal axis 121, a fastening region 400, an adjoining blade platform 403 and also a blade airfoil 406 and a blade tip 415.

As a stationary blade 130, the blade 130 may have a further platform at its blade tip 415 (not represented).

In the fastening region 400 there is formed a blade root 183, which serves for the fastening of the moving blades 120, 130 to a shaft or a disk (not represented).

The blade root 183 is designed for example as a hammer head. Other designs as a firtree or dovetail root are possible.

The blade 120, 130 has for a medium which flows past the blade airfoil 406 a leading edge 409 and a trailing edge 412.

In the case of conventional blades 120, 130, solid metallic materials, in particular superalloys, are used for example in all the regions 400, 403, 406 of the blade 120, 130.

Such superalloys are known, for example, from EP 1 204 776 B1, EP 1 306 454, EP 1 319 729 A1, WO 99/67435 or WO 00/44949.

The blade 120, 130 may in this case be produced by a casting method, also by means of directional solidification, by a forging method, by a milling method or combinations of these.

Workpieces with a monocrystalline structure or structures are used as components for machines which are exposed to high mechanical, thermal and/or chemical loads during operation.

The production of monocrystalline workpieces of this type takes place for example by directional solidification from the melt. This involves casting methods in which the liquid metallic alloy solidifies to form the monocrystalline structure, i.e. to form the monocrystalline workpiece, or in a directional manner.

Dendritic crystals are thereby oriented along the thermal flow and form either a columnar grain structure (i.e. grains which extend over the entire length of the workpiece and are commonly referred to here as directionally solidified) or a monocrystalline structure, i.e. the entire workpiece comprises a single crystal. In these methods, the transition to globulitic (polycrystalline) solidification must be avoided, since undirected growth necessarily causes the formation of transversal and longitudinal grain boundaries, which nullify the good properties of the directionally solidified or monocrystalline component.

While reference is being made generally to solidified structures, this is intended to mean both monocrystals, which have no grain boundaries or at most small-angle grain boundaries, and columnar crystal structures, which indeed have grain boundaries extending in the longitudinal direction but no transversal grain boundaries. These second-mentioned crystalline structures are also referred to as directionally solidified structures.

Such methods are known from U.S. Pat. No. 6,024,792 and EP 0 892 090 A1.

Similarly, the blades 120, 130 may have coatings against corrosion or oxidation, for example (MCrAlX; M is at least one element of the group comprising iron (Fe), cobalt (Co) and nickel (Ni), X is an active element and represents yttrium (Y) and/or silicon and/or at least one element of the rare earths, or hafnium (Hf)). Such alloys are known from EP 0 486 489 B1, EP 0 786 017 B1, EP 0 412 397 B1 or EP 1 306 454 A1.

The density is preferably 95% of the theoretical density.

A protective aluminum oxide layer (TGO=thermal grown oxide layer) forms on the MCrAlX layer (as an intermediate layer or as the outermost layer).

The composition of the layer preferably comprises Co-30Ni-28Cr-8Al-0.6Y-0.7Si or Co-28Ni-24Cr-10Al-0.6Y. Apart from these cobalt-based protective coatings, nickel-based protective coatings are also preferably used, such as Ni-10Cr-12Al-0.6Y-3Re or Ni-12Co-21Cr-11Al-0.4Y-2Re or Ni-25Co-17Cr-10Al-0.4Y-1.5Re.

A thermal barrier coating which is preferably the outermost layer and consists for example of $ZrO_2$, $Y_2O_3$—$ZrO_2$, i.e. is unstabilized, partially stabilized or completely stabilized by yttrium oxide and/or calcium oxide and/or magnesium oxide, may also be present on the MCrAlX.

The thermal barrier coating covers the entire MCrAlX layer.

Columnar grains are produced in the thermal barrier coating by suitable coating methods, such as for example electron-beam physical vapor deposition (EB-PVD).

Other coating methods are conceivable, for example atmospheric plasma spraying (APS), LPPS, VPS or CVD. The thermal barrier coating may have grains which are porous, are provided with microcracks or are provided with macrocracks for better thermal shock resistance. The thermal barrier coating is therefore preferably more porous than the MCrAlX layer.

Refurbishment means that components 120, 130 may have to be freed of protective layers after use (for example by sandblasting). This is followed by removal of the corrosion and/or oxidation layers or products. If need be, cracks in the component 120, 130 are then also repaired. This is followed by recoating of the components 120, 130 and renewed use of the components 120, 130.

The blade 120, 130 may be hollow or be of a solid form. If the blade 120, 130 is to be cooled, it is hollow and may also have film cooling holes 418 (indicated by dashed lines).

Figure 3:
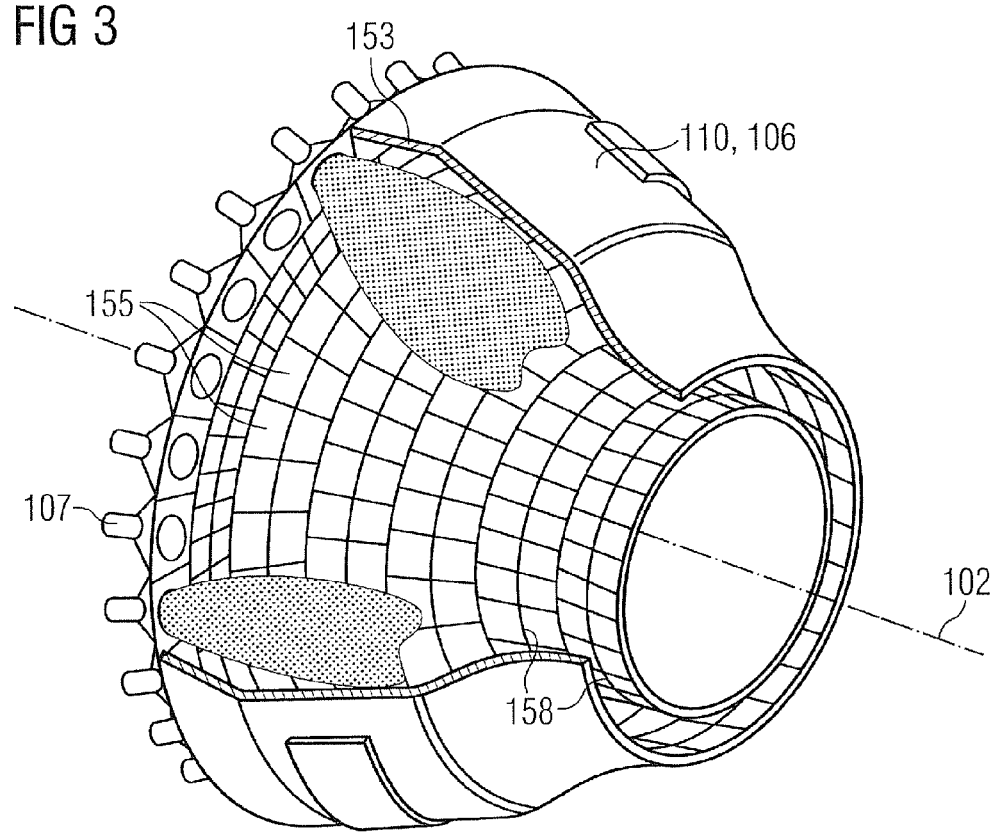
FIG. 3 shows a gas turbine combustion chamber in a partially sectioned perspective representation.

FIG. 3 shows a combustion chamber 110 of a gas turbine. The combustion chamber 110 is designed for example as what is known as an annular combustion chamber, in which a multiplicity of burners 107, which produce flames 156 and are arranged in the circumferential direction around an axis of rotation 102, open out into a common combustion chamber space 154. For this purpose, the combustion chamber 110 is designed as a whole as an annular structure, which is positioned around the axis of rotation 102.

To achieve a comparatively high efficiency, the combustion chamber 110 is designed for a comparatively high temperature of the working medium M of approximately 1000° C. to 1600° C. To permit a comparatively long operating time even with these operating parameters that are unfavorable for the materials, the combustion chamber wall 153 is provided on its side facing the working medium M with an inner lining formed by heat shielding elements 155.

Each heat shielding element 155 of an alloy is provided on the working medium side with a particularly heat-resistant protective layer (MCrAlX layer and/or ceramic coating) or is produced from material that is resistant to high temperature (solid ceramic bricks).

These protective layers may be similar to the turbine blades, meaning for example MCrAlX: M is at least one element of the group comprising iron (Fe), cobalt (Co) and nickel (Ni), X is an active element and represents yttrium (Y) and/or silicon and/or at least one element of the rare earths, or hafnium (Hf). Such alloys are known from EP 0 486 489 B1, EP 0 786 017 B1, EP 0 412 397 B1 or EP 1 306 454 A1.

A thermal barrier coating which is for example a ceramic thermal barrier coating and consists for example of $ZrO_2$, $Y_2O_3$—$ZrO_2$, i.e. is unstabilized, partially stabilized or completely stabilized by yttrium oxide and/or calcium oxide and/or magnesium oxide, may also be present on the MCrAlX.

Columnar grains are produced in the thermal barrier coating by suitable coating methods, such as for example electron-beam physical vapor deposition (EB-PVD).

Other coating methods are conceivable, for example atmospheric plasma spraying (APS), LPPS, VPS or CVD. The thermal barrier coating may have grains which are porous, are provided with microcracks or are provided with macrocracks for better thermal shock resistance.

Refurbishment means that heat shielding elements 155 may have to be freed of protective layers after use (for example by sandblasting). This is followed by removal of the corrosion and/or oxidation layers or products. If need be, cracks in the heat shielding element 155 are then also repaired. This is followed by recoating of the heat shielding elements 155 and renewed use of the heat shielding elements 155.

On account of the high temperatures in the interior of the combustion chamber 110, a cooling system may also be provided for the heat shielding elements 155 or for their holding elements. The heat shielding elements 155 are for example hollow and, if need be, also have cooling holes (not represented) opening out into the combustion chamber space 154.

Figure 4:
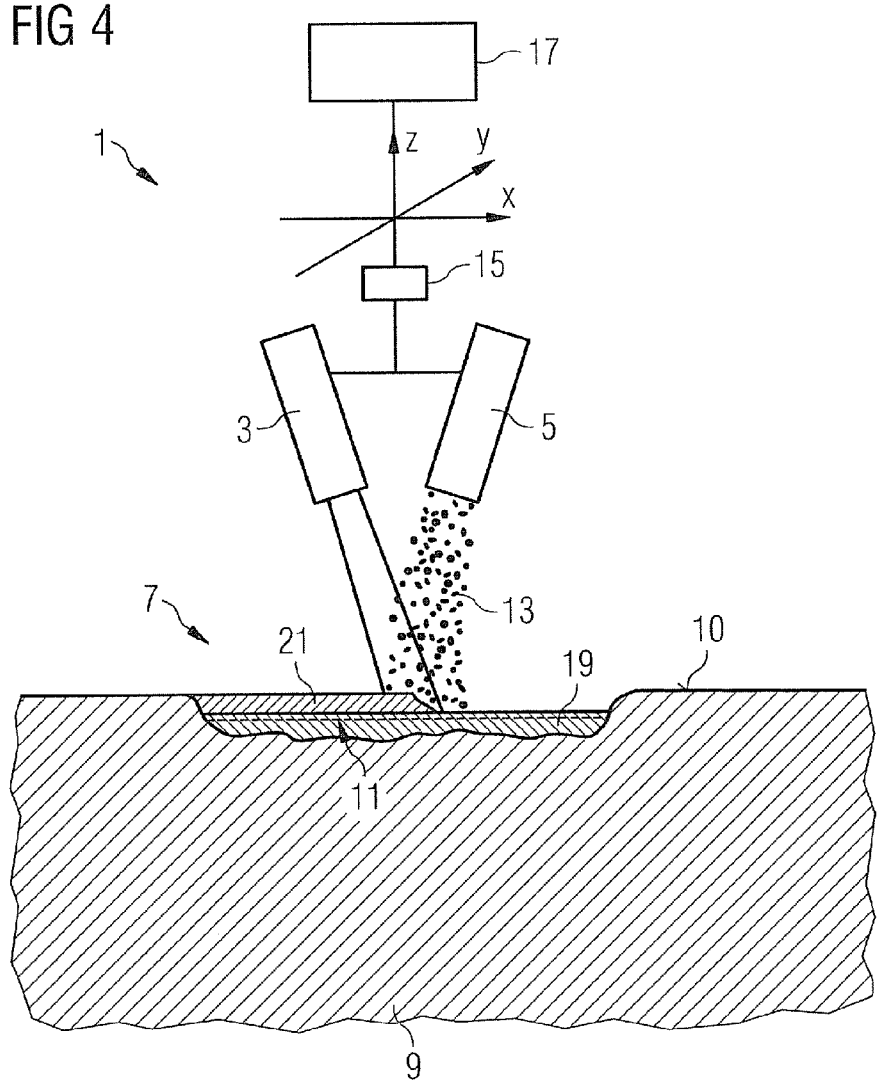
FIG. 4 shows the welding apparatus according to the invention in a schematic representation.

FIG. 4 shows a welding apparatus 1 in a highly schematized representation.

This apparatus comprises a laser 3 and a powder supplying device 5, with which a powdered welding filler can be applied to the region to be welded of a workpiece 9. By means of the laser radiation, a heat input zone 11 is formed on the workpiece surface, into which zone the powder 13 is introduced by the powder supplying device 5. The laser is preferably a 300 W laser, particularly an Nd-YAG laser, most particularly with $\lambda=1.06$ µm. The laser power is between 100 W and 300 W and preferably between 100 W and 200 W, most particularly between 100 W and 150 W. The welding material is thus advantageously melted well and also fused well to the underlying surface, in order that a sealed weld point is obtained.

The laser 3 and the powder supplying device 5 are arranged on a scanning device 15, which makes it possible for the laser 3 and the powder supplying device 5 to be displaced in two dimensions along the component surface (x and y directions in FIG. 4) with the region 7 to be welded. The speed of the process is at least 250 mm/min, particularly 400 mm/min-600 mm/min, most particularly 500 mm/min. An advantageous heat input into the welding material and the substrate is thus possible.

Furthermore, the scanning device 15 of the present exemplary embodiment makes it possible for the laser 3 and the powder supplying device 5 to be displaced perpendicularly in relation to the component surface (z direction in FIG. 4). With the aid of the scanning device 15, the heat input zone and the impingement zone of the powder can consequently be displaced along a predetermined path. A robot arm may be used for example as the scanning device. The diameter of the laser beam is particularly 500 μm to 800 μm, most particularly 600 μm. Consequently, the welding material supplied can be advantageously heated.

The controlling of the movement instigated by the scanning device 15 is performed by a control unit 17, which also controls the other parameters of the welding process. As a difference from the present exemplary embodiment, the controlling of the other parameters of the welding process may, however, also be performed by an additional control, that is to say separately from the control of the movement sequence. Furthermore, as a difference from the exemplary embodiment represented, a movable component holder may also be used instead of the scanning device 15 for moving the laser 3 and the powder supplying device 5. All that is important for the invention is the relative movement between the laser 3 and the powder supplying device 5 on the one hand and the workpiece 9 on the other hand.

The method according to the invention for the build-up welding of a workpiece surface may be used for material application, in particular for multi-layer material application, to the region 7 to be welded of a component 9. In this case, the component 9 needs neither to be preheated nor to be overaged by means of a heat treatment.

The method is described below on the basis of build-up welding on the surface 10 of a turbine blade 9 as a workpiece.

The turbine blade of the present exemplary embodiment consists of a γ'-strengthened nickel-based superalloy, for example of IN 738 LC, IN 939, Rene 80, IN 6203 DS, PWA 1483 SX, Alloy 247, etc. The region 7 to be welded in the surface 10 of the turbine blade 9 is welded by building up layer after layer, the heat input zone being moved together with the impingement region for the powder 13 along a welding direction over the region 7 to be welded of the turbine blade 9. The powder 13 is in the present case a powder of a γ'-containing nickel-based superalloy, for example of IN 78 LC, IN 939, Rene 80, IN 6203 DS, PWA 1483, Alloy 247, etc.

Figure 5:
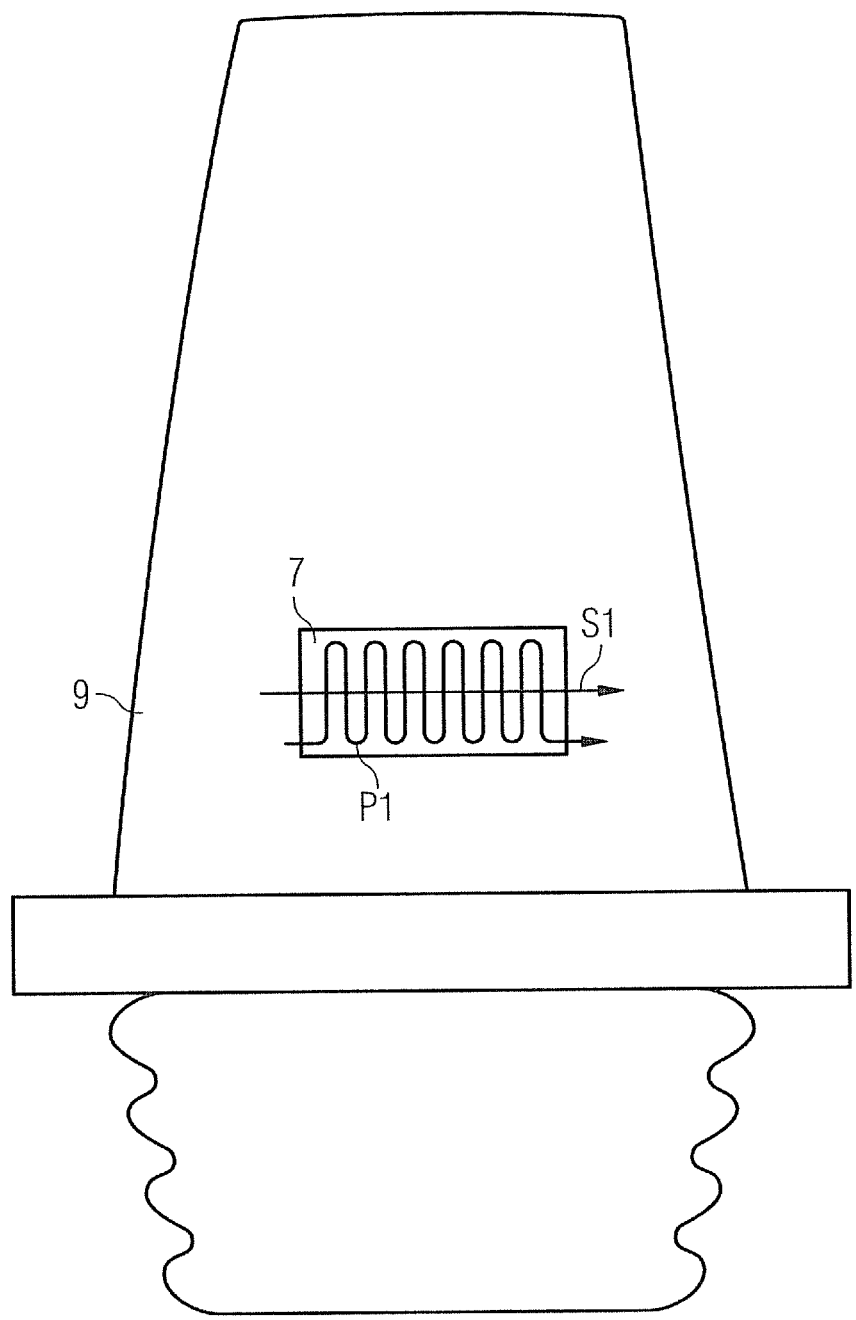
FIG. 5 shows the welding path for a first layer of welding filler.

The path P1 followed by the heat input zone 11 and the impingement region of the powder 13 during the build-up welding of the first layer on the region 7 to be welded is schematically represented in FIG. 5. The figure shows the turbine blade 9 with the region 7 to be welded and the welding direction S1 during the build-up welding of the first layer 19. The heat input zone 11, which at the same time represents the impingement region for the powder 13, is however not displaced linearly along the welding direction S1 but instead it simultaneously oscillates during the displacement along the welding direction in a direction perpendicular to the welding direction. As a result, the heat input zone 11 and the impingement region of the powder 13 follow a meandering path P1 over the region 7 to be welded.

Figure 6:
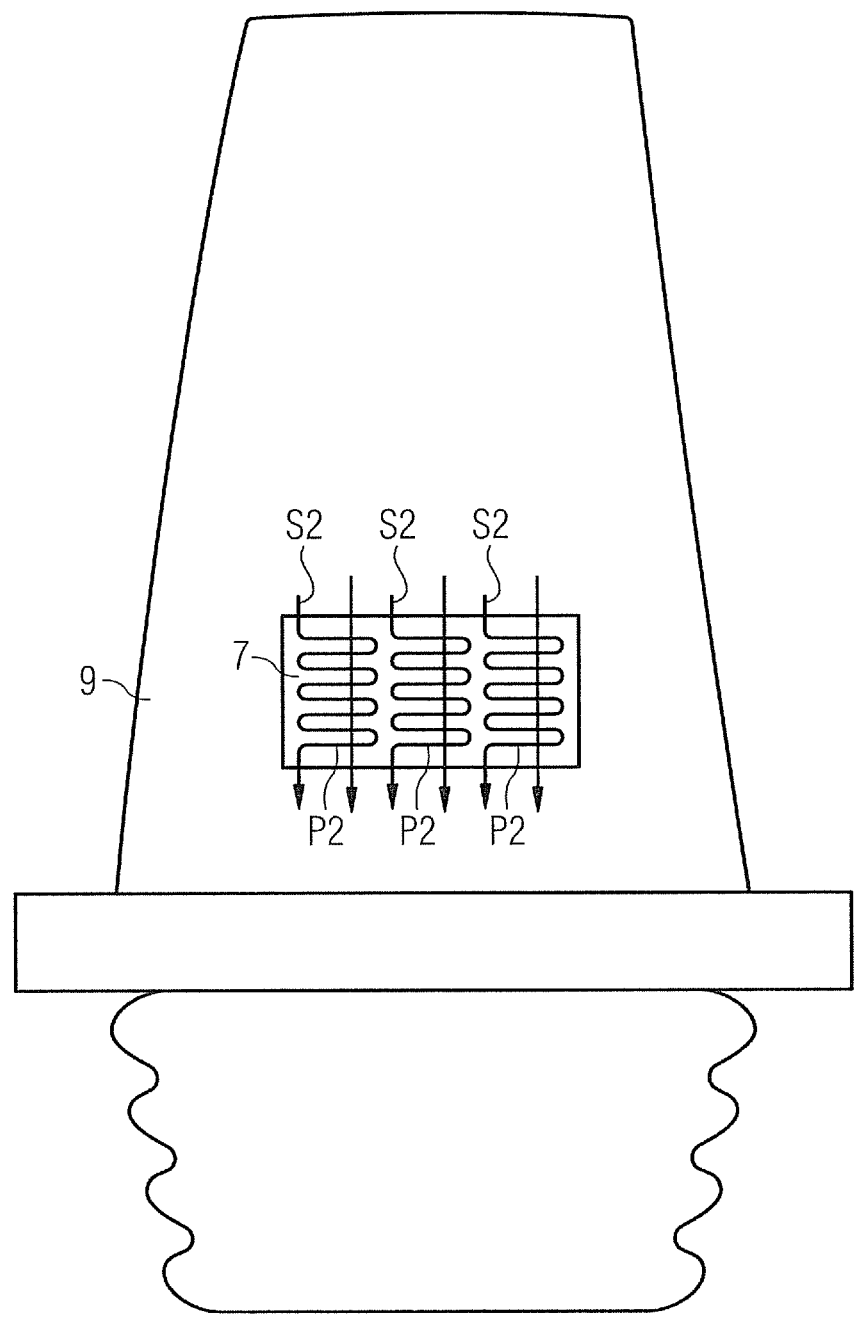
FIG. 6 shows the welding path for a second layer of welding filler.

For the build-up welding of the second layer 21 (FIG. 4), the laser 3 and the powder supplying device 5 are displaced a little along the z direction of the scanning device 15. Furthermore, in the present exemplary embodiment, the welding direction S2 is turned by 90° with respect to the welding direction S1 for the first layer. The path P2 of the heat input zone 11 and of the impingement region for the powder 13 during the build-up welding of the second layer 21 is represented in FIG. 6. Also during the build-up welding of the second layer 21, the heat input zone 11 oscillates together with the impingement region of the powder 13 in a direction perpendicular to the welding direction S2. Therefore, a meandering path P2 of the heat input zone 11 and the impingement region for the powder 13 over the region 7 to be welded is obtained overall.

The paths described in conjunction with the exemplary embodiment represent only one of various possible variants. In principle, there are several possibilities for carrying out the welding: 1. unidirectional or 2. bidirectional (for example meandering) build-up welding. In the case of each of these variants, the traces (paths) of the 2nd layer may be welded in a parallel offset or perpendicular manner in relation to the traces (paths) of the first layer. All of these variants may be used within the scope of the method according to the invention.

When moving the laser and the powder supplying unit, the oscillation may be chosen such that the entire region 7 to be welded is passed over with a single path along the welding direction, as represented in FIG. 5, or such that only part of the region 7 to be welded is passed over and a number of paths P2 running next to one another in the welding direction S2 are traveled for the build-up welding of the region as a whole, as represented in FIG. 6.

The moving of the heat input zone 11 and the impingement region of the powder 13 along the path P1 or P2 is performed in the present exemplary embodiment with a speed of the process of at least 500 mm/min.

The mass feed rate is ≤350 mg/min, preferably ≤330 mg/min (since build-up welding is involved, the value zero is excluded, i.e. at least 50 mg/min, especially at least 100 mg/min). This has the advantage that the fed welding material melts very well, achieves a high temperature and thus cools to a greater extent while cooling.

The laser power, the beam diameter and the powder stream are in this case chosen such that the cooling rate of the region passed over during the solidification is greater than 8000 K/s. During the building up of the second layer 21, the process parameters with respect to laser power and beam diameter are also chosen such that the remelting depth to which the first layer 19 is remelted is less than 50% of the trace height of the first layer 19. The remelting depth is indicated in FIG. 4 by dashed lines. In principle, speeds of the process other than that specified in the present example are also possible, the other parameters, laser power, beam diameter and powder stream, then having to be adapted correspondingly.

The high cooling rate and high solidifying rate have the effect of increasing the distribution coefficient to such an extent that micro segregations are largely avoided. The molten material brought about by the heat input zone 11 solidifies dendritically, the crystal structure being taken over from the crystal structure present in the remelted region. In this case, the directions of growth of the dendrites vary along a path P1, P2. The reason for this is that the orientation of the possible directions of growth of the dendrites in relation to the temperature gradient varies, the direction of growth with the smallest inclination in relation to the temperature gradient or with the smallest rate of growth prevailing. Furthermore, seeds which form ahead of the solidification front and are caught up by the solidification front during the solidification initiate directions of dendrite growth that are randomly distributed. These irregularly distributed dendrite orientations are predominantly in the upper half of a layer 19. The small remelting depth ensures that the solidification front comes down on a region with irregularly distributed dendrite orientations, which in the case of multi-layer welding has the result that a polycrystal with grains of a very small average diameter is generated.

As a result, the welded region of the turbine blade 9 is insensitive to crack formation.

Once the application of the required number of layers 19, 21 has taken place, the turbine blade 9 can be subjected to a heat treatment which produces the desired γ' morphology. This serves for further improving the strength of the welded region of the turbine blade 9.

With the method according to the invention, build-up welding can be performed at room temperature and without prior overaging of the component to be welded, the occurrence of solidification cracks and remelting cracks being suppressed. This results in a quality of the welding that is acceptable for structural welding, in particular for highly stressed regions of gas turbine blades, but also of other components. At the same time, there is only very little influencing of the base material, since there is only very little heat input into the substrate as a result of the small heat-affected zone (no preheating takes place) and the suppression of remelting cracks in the heat-affected zone.

The invention claimed is:

1. A method for welding a workpieces of a high-temperature superalloy comprising:
    applying welding filler to a heat input zone of a workpiece surface from a supply zone, the heat input zone formed by application of energy to the workpiece surface;
    melting the welding filler to form molten welding filler;
    resolidifying the molten welding filler to form a first resolidified material;
    moving the heat input zone along with the supply zone and the workpiece surface in relation to one another to apply and melt additional welding filler on the workpiece surface, and
    resolidifying the molten additional welding filler to form additional resolidified material,
    wherein the workpiece comprises a γ'-containing nickel-based superalloy,
    wherein the welding filler materials comprise a γ'-forming nickel-based superalloy material,
    wherein a mass feed rate for the welding filler materials applied to the workpiece surface is ≤350 mg/min, and
    wherein at least a welding power and a diameter of the heat input zone are selected such that a cooling rate during resolidifying of the molten welding filler materials is at least 8000 Kelvins per second.

2. The method as claimed in claim 1, wherein the mass feed rate is ≤330 mg/min.

3. The method as claimed in claim 2, wherein the mass feed rate is ≤300 mg/min.

4. The method as claimed in claim 1, wherein a speed of the process is at least 250 mm/min.

5. The method as claimed in claim 4, wherein the speed of the process is 400 mm/min.

6. The method as claimed in claim 1, further comprising forming a weld seam comprising a plurality of layers by applying, melting, and resolidifying welding filler layer by layer.

7. The method as claimed in claim 6, wherein a previous layer is melted during the forming of the weld seam.

8. The method as claimed in claim 7, wherein a previous layer is remelted in less than half its layer thickness.

9. The method as claimed in claim 6,
    wherein for each layer, the heat input zone and the supply zone are moved in relation to the workpiece surface along a welding direction, and
    wherein the welding directions of successive layers are turned with respect to one another.

10. The method as claimed in claim 1,
    wherein the heat input zone and the supply zone are moved in relation to the workpiece surface on a path perpendicular to the welding direction.

11. The method as claimed in claim 1, wherein a 300 W laser is used to melt the welding filler materials.

12. The method as claimed in claim 1, wherein a Nd-YAG laser is used with λ=1.06 μm to melt the welding filler materials.

13. The method as claimed in claim 12,
    wherein the laser power is 100 W to 300 W.

14. The method as claimed in claim 1, wherein the energy comprises a laser beam, and wherein a diameter of a laser beam is 500 μm to 800 μm.

15. The method as claimed in claim 1, wherein a polycrystalline weld seam with irregularly distributed dendrite orientations is achieved by the method.

16. The method as claimed in claim 1, wherein the mass feed rate is at least 50 mg/min.

17. A method for welding a workpiece of a high-temperature superalloy comprising:
    applying a first amount of a welding filler to the workpiece at a predetermined feed rate in a first predetermined pattern;
    melting the first amount of welding filler on the workpiece via application of energy from an energy source;
    resolidifying the molten first amount of welding filler to form a first resolidified layer;
    applying a second amount of welding filler to the workpiece on the first resolidified layer in a second predetermined pattern;
    melting the second amount of welding filler via application of energy from the laser source in the second predetermined pattern;
    resolidifying the molten second amount of molten welding filler to form a second resolidified layer on the first resolidified layer;
    wherein during the melting of the second amount of welding filler, a depth of the first resolidified layer is remelted,
    wherein the depth is less than 50% of a height of the first resolidified layer,
    wherein a cooling rate for the resolidifying of the first and second molten welding filler materials is at least 8000 Kelvins per second, and
    wherein the molten first and second amounts of welding filler reoslidify to form randomly distributed dendritic structures within the first and second resolidified layers.

18. The method of claim 16, wherein the first predetermined pattern comprises an oscillating pattern transverse to a first welding direction, wherein the second predetermined pattern comprises an oscillating pattern transverse to a second welding direction, and wherein the second welding direction is oriented 90 degrees relative to the first welding direction.

19. The method of claim 16, wherein the dendrites are randomly distributed along the first and second predetermined patterns, and wherein a cooling rate for the resolidifying of the first and second molten welding filler materials is at least 8000 Kelvins per second.

* * * * *